United States Patent
Bozak et al.

(10) Patent No.: US 7,644,137 B2
(45) Date of Patent: Jan. 5, 2010

(54) WORKLOAD BALANCING IN ENVIRONMENTS WITH MULTIPLE CLUSTERS OF APPLICATION SERVERS

(75) Inventors: Erol Bozak, Pforzheim (DE); Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 761 days.

(21) Appl. No.: 11/011,713

(22) Filed: Dec. 14, 2004

(65) Prior Publication Data

US 2006/0143495 A1   Jun. 29, 2006

(51) Int. Cl.
*G06F 15/13* (2006.01)
(52) U.S. Cl. ............... 709/219; 709/203; 709/217; 709/223; 709/226; 709/238; 710/36; 711/150
(58) Field of Classification Search ............... 709/203, 709/217, 219, 223, 226, 238; 710/36; 711/150
See application file for complete search history.

(56) References Cited

U.S. PATENT DOCUMENTS

| | | | |
|---|---|---|---|
| 6,779,039 B1 * | 8/2004 | Bommareddy et al. ...... 709/238 |
| 6,862,623 B1 * | 3/2005 | Odhner et al. ............... 709/226 |
| 7,290,059 B2 * | 10/2007 | Yadav ........................ 709/242 |
| 7,305,471 B2 * | 12/2007 | Odhner et al. ............... 709/226 |
| 2005/0080885 A1 * | 4/2005 | Ahmed et al. ................ 709/223 |
| 2005/0183139 A1 * | 8/2005 | Goddard ....................... 726/11 |
| 2005/0278453 A1 * | 12/2005 | Cherkasova ................. 709/231 |
| 2006/0015555 A1 * | 1/2006 | Douglass et al. ............ 709/203 |

* cited by examiner

*Primary Examiner*—Jinsong Hu
(74) *Attorney, Agent, or Firm*—Finnegan, Henderson, Farabow, Garrett & Dunner, LLP (57) ABSTRACT

Methods and apparatus, including computer program products, for workload balancing in environments with multiple clusters of servers. A process for sharing resources from a pool of servers among a first cluster of servers and a second cluster of servers includes determining a current workload of the first cluster and determining a current workload of the second cluster. The process calculates a combined workload of the first and second clusters, and allocates a first number of servers from the pool to the first cluster, the first number equal to a product of a total number of servers in the pool and the first server's workload divided by the combined workload.

22 Claims, 4 Drawing Sheets

WORKLOAD BALANCING IN ENVIRONMENTS WITH MULTIPLE CLUSTERS OF APPLICATION SERVERS

BACKGROUND

The present invention relates to data processing by digital computer, and more particularly to workload balancing in environments with multiple clusters of application servers.

In general, clustering is the use of multiple computers, multiple storage devices, and redundant interconnections, to form what appears to users as a single highly available system. Cluster computing can be used for load balancing as well as for high availability. Load balancing is dividing the amount of work that a computer has to do between two or more computers so that more work gets done in the same amount of time and, in general, all users get served faster. Load balancing can be implemented with hardware, software, or a combination of both.

Traditional workload balancing methods in clustered application server environments focus on distribution of load within a single cluster to a static amount of server instances. This static sizing and distribution of load has drawbacks in the performance and resource utilization when multiple clusters are deployed and operated in parallel.

SUMMARY

The present invention provides methods and apparatus, including computer program products, for workload balancing in environments with multiple clusters of application servers.

In one aspect, the invention features a method for sharing resources from a pool of servers among a first cluster of servers and a second cluster of servers including determining a current workload of the first cluster, determining a current workload of the second cluster, calculating a combined workload of the first and second clusters, and allocating a first number of servers from the pool to the first cluster, the first number equal to a product of a total number of servers in the pool and the first server's workload divided by the combined workload.

In embodiments, allocating the first number of servers can include checking a current allocation of servers to the first cluster, reassigning a number of servers from the first cluster to the second cluster if the first number of servers can be less than the current allocation, and assigning a number of servers to the first cluster from the second cluster if the first number of servers can be greater than the current allocation. Each server from the pool can include two server instances, one for each cluster, and assigning a server to the first cluster can include activating a server application on the server for the first cluster.

Reassigning a server from the first cluster can include deactivating a server application on the server for the first cluster. Deactivating the server application on the server can include releasing resources on the server. Deactivating the server application on the server can include terminating a process previously spawned by the server application upon request by the first cluster. The server can execute a server application and assigning a server to the first cluster can include sending a command to the server instance to respond to requests from the first cluster. Reassigning a server from the first cluster can include sending a command to the server application to respond to requests from the second cluster.

Determining a current workload of the first cluster can include receiving a notification from a dispatcher for the first cluster. Determining a current workload of the first cluster can include querying a dispatcher for the first cluster.

In another aspect, the invention features a system for sharing resources from a pool of servers among clusters of servers including a first and a second cluster of servers, each cluster including a dispatcher, the pool of servers, and a management system for the pool, the management system configured at least to dynamically assign servers from the pool to each cluster based on the cluster's relative portion of a total work load for the clusters.

In embodiments, the management system can be configured to maintain a table including, for each cluster, a current work load and currently allocated servers from the pool. Each server in the pool can execute one server application to handle requests for services by the clusters. Each server in the pool can execute a server application for each cluster to handle requests for services by the cluster. The management system can be configured to do at least the following: determine a current workload of the first cluster, determine a current workload of the second cluster, calculate a combined workload of the first and second clusters, and allocate a first number of servers from the pool to the first cluster, the first number equal to a product of a total number of servers in the pool and the first server's workload divided by the combined workload. Allocating the first number of servers can include checking a current allocation of servers to the first cluster, reassigning one or more servers from the first cluster to the second cluster if the first number of servers can be less than the current allocation, and assigning one or more servers to the first cluster from the second cluster if the first number of servers can be greater than the current allocation.

Each server from the pool can maintain two server applications, one server application for each cluster, and assigning a server to the first cluster can include activating a server application on the server for the first cluster. Reassigning a server from the first cluster can include deactivating a server application for the first cluster. Deactivating the server application can include releasing resources on the server. Deactivating the server application can include terminating a process spawned by the server application upon request by the first cluster. The server can maintain a server application and assigning a server to the first cluster can include sending a request to the server application to respond to requests from the first cluster. Reassigning a server from the first cluster can include sending a request to the server application to respond to requests from the second cluster. Determining a current workload of the first cluster can include receiving a notification from a dispatcher for the first cluster. Determining a current workload of the first cluster can include querying a dispatcher for the first cluster.

The invention can be implemented to realize one or more of the following advantages. One implementation of the invention provides all of the above advantages.

A central instance, which balances the workload over multiple clustered application servers, actively monitors a load of each cluster and maintains a table where a state of each cluster is indicated and upon which resources are assigned.

The provisioning of a resource for a cluster is done by activation/deactivation or instance sharing. There is no hard image copy or dynamic installation of software.

Resources are assigned for a cluster depending on the relative portion of the total load.

Since workload is centrally monitored and managed, resource assignment is accomplished in a clear and predictable manner.

Other features and advantages of the invention are apparent from the following description, and from the claims.

DESCRIPTION OF THE DRAWINGS

FIG. 4 is a flow diagram.
Like reference numbers and designations in the various drawings indicate like elements.

DETAILED DESCRIPTION

Figure 1:
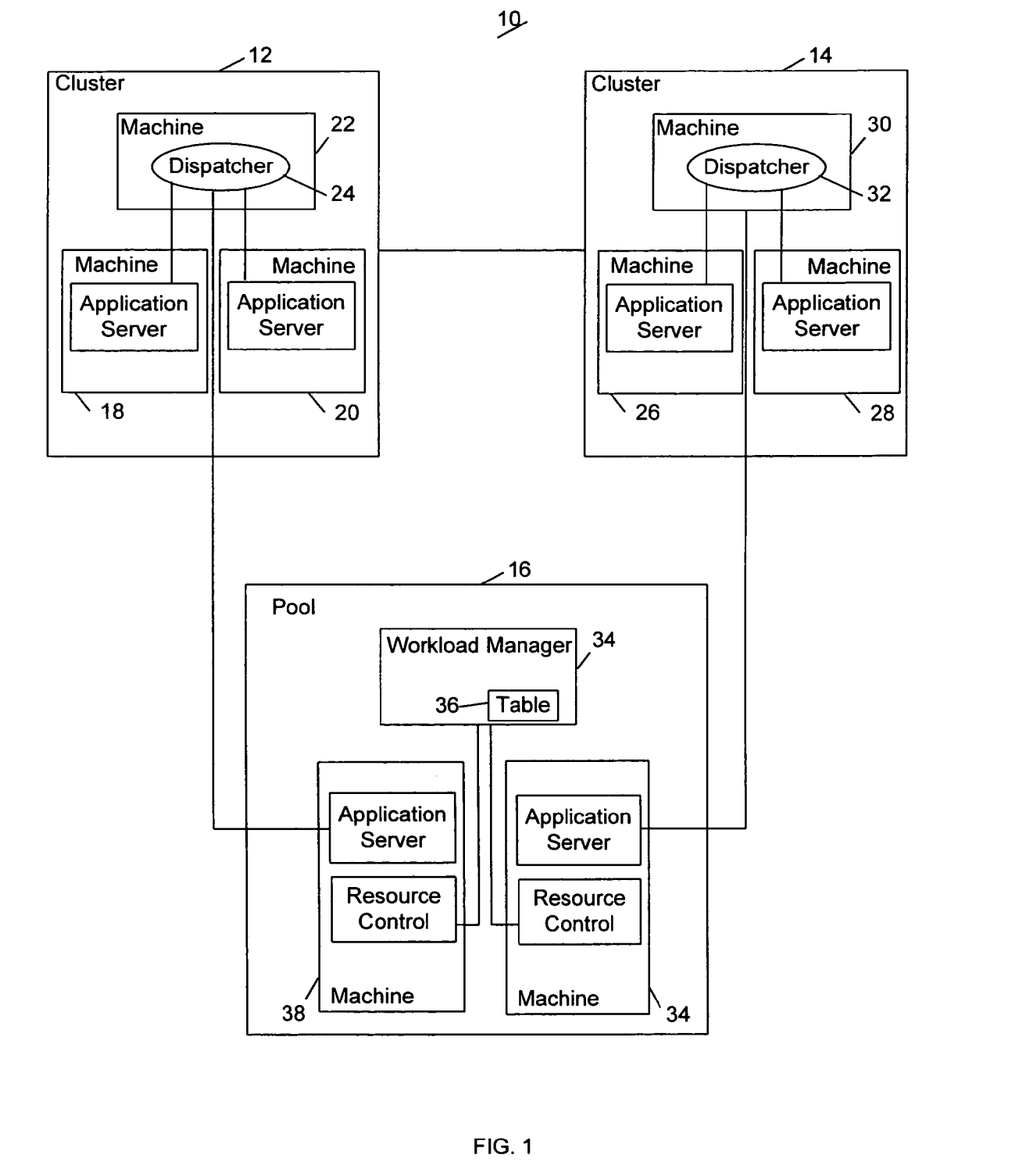
FIG. 1 is a block diagram.

As shown in FIG. 1, an exemplary clustered application server environment 10 includes a clustered application server (i.e., cluster) 12, a clustered application server (i.e., cluster) 14 and a resource balancing system (i.e., pool) 16. Cluster 12 includes a network of application servers 18, 20 and a dispatching system 22. Dispatching system 22 includes a dispatcher 24. In general, a dispatcher is a process that enables many clients to connect to the same server without the need for a dedicated server process for each client. A dispatcher handles and directs multiple incoming network session requests to shared server processes.

41 Cluster 14 includes a network of application servers 26, 28 and a dispatching system 30. Dispatching system 30 includes a dispatcher 32. The resource control 33 assigns a resource (machine) to a specific cluster by starting/stopping respective activation/deactivation of server instances. The resource control 33 performs specific actions requested by a workload manager 34. The resource balancing system 16 includes the workload manager 34 that maintains a workload table 36. The workload table 36 includes, for example, a state indication of each cluster and a list of which resources are assigned to particular clusters. The resource balancing system 16 allows a dynamic sizing of clustered application servers (e.g., cluster 12 and cluster 14) by assigning resources from the pool 16.

The amount of resources available for a cluster at a particular time is dependent on its current workload and an underlying balancing policy. More specifically, the amount of resources available for a cluster i at a time t is defined as follows:

$$R(t, i) = R_{static}(i) + R_{pool}(t, i),$$

where $R_{static}$ is the amount of resources assigned statically and $R_{pool}$ is the amount of resources assigned from the pool.

In the following example, a resource is considered to be a computing device (e.g., machine) capable of running a single server instance. In programming, instantiation is the generation of a real instance or particular realization of an abstraction or template such as a class of objects or a computer process. To instantiate is to generate such an instance by, for example, defining one particular variation of an object within a class, giving it a name, and locating it in some physical place. In object-oriented programming, for example, some writers say that you instantiate a class to generate an object, a concrete instance of the class. The object is an executable file that can run in a computer. In approaches to data modeling and programming prior to object-oriented programming, one usage of instantiate was to make a real (data-filled) object from an abstract object as you would do by generating an entry in a database table (which, when empty, can be thought of as a kind of class template for the objects to be filled in). This association is valid for object oriented programming. Here a server instance is just the server process, i.e., a server machine is a single element in a cluster. One can have multiple instances on a single computer. The term "instance" is used to avoid confusion when people discuss "servers" whereby a physical computer plus one or more running server processes are referred.

Coordination and work load balancing in the environment 10 is performed by the workload manager 34 that manages the set of clusters 12, 14 and the dedicated pool 16 that includes a set of machines 38, 40. The workload manager 34 maintains the table 36 that stores/lists all assigned machines to each cluster and a current workload of each cluster. The table 36 is updated regularly, in the simplest example, by periodically requesting a current workload from each server in the cluster to calculate an overall workload. An assignment of resources (e.g., machines) is performed according to a balancing policy that defines the amount of machines a certain cluster can have at any given time, i.e., R(t, i). In a particular example, the following equation represents a workload balancing policy that assigns resources to a cluster depending on the cluster's relative portion of the total workload:

$$R_{pool}(t, i) = R_{total} \frac{L(t, i)}{\sum_{k}^{n} L(t, k)},$$

where $R_{pool}(t, i)$ is the amount of assignable resources (machines) for cluster i at time t, $R_{total}$ is the total amount of resources available in the pool, and L(t, i) is the workload of the cluster i at time t.

Figure 2:
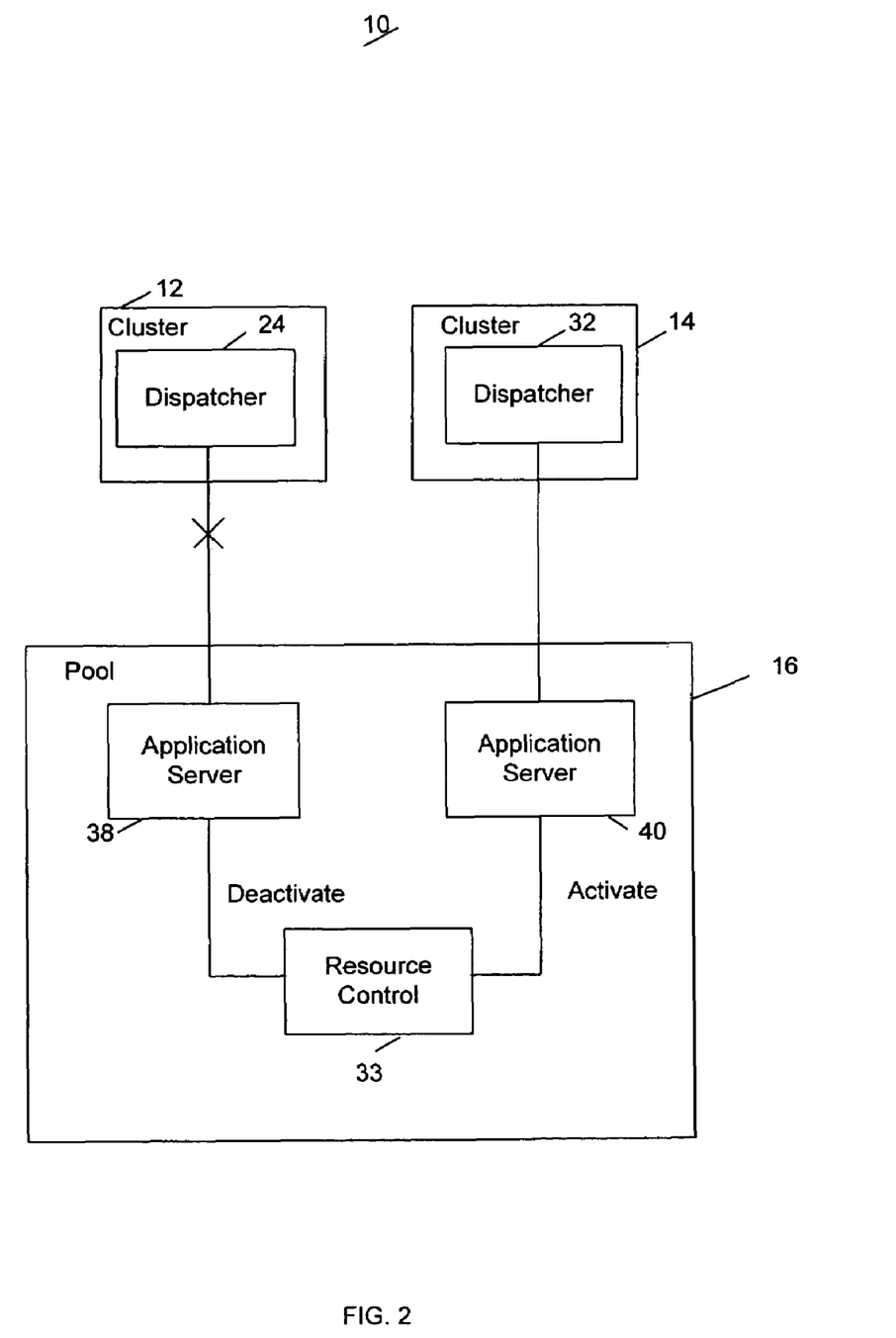
FIG. 2 is a block diagram.

In one particular example, assignment of resources is performed by activation and deactivation of server instances. As shown in FIG. 2, each cluster 12, 14 has a server instance 38, 40 running on each machine in the pool 16, i.e., each machine has as many server instances as clusters and each instance on one machine belongs to a different cluster. The instances 38, 40 are activated and deactivated respectively according to a load distribution. However, only one server can be active at a time while the other is inactive and does not consume resources. A deactivation of a server instance is done by detaching it from a dispatcher so that no requests from the dispatcher are served anymore.

Although the activation and deactivation of server instances by attaching and detaching from the dispatcher allows fast reaction, resources may not be released by the instance since the entire process is still running (e.g., memory consumption, open sockets, database connections, and so forth). This resource consumption can be minimized by passivating the servers, either by shutting down components and services of the server so that only a minimum fragment of the server is running (e.g., micro-kernel), or by terminating the entire process of the server. While the first method reduces the resource consumption of the server to a minimum, the second method ensures that no resources are consumed anymore by the particular server.

In one example, the overall load for each cluster is calculated by requesting the current workload for each associated server. These requests can be bandwidth consuming when the amount of managed resources and the amount of servers are very high. In a particular example, the load of a cluster can be provided by an associate dispatcher that informs its current workload status by notification or upon request.

Figure 3:
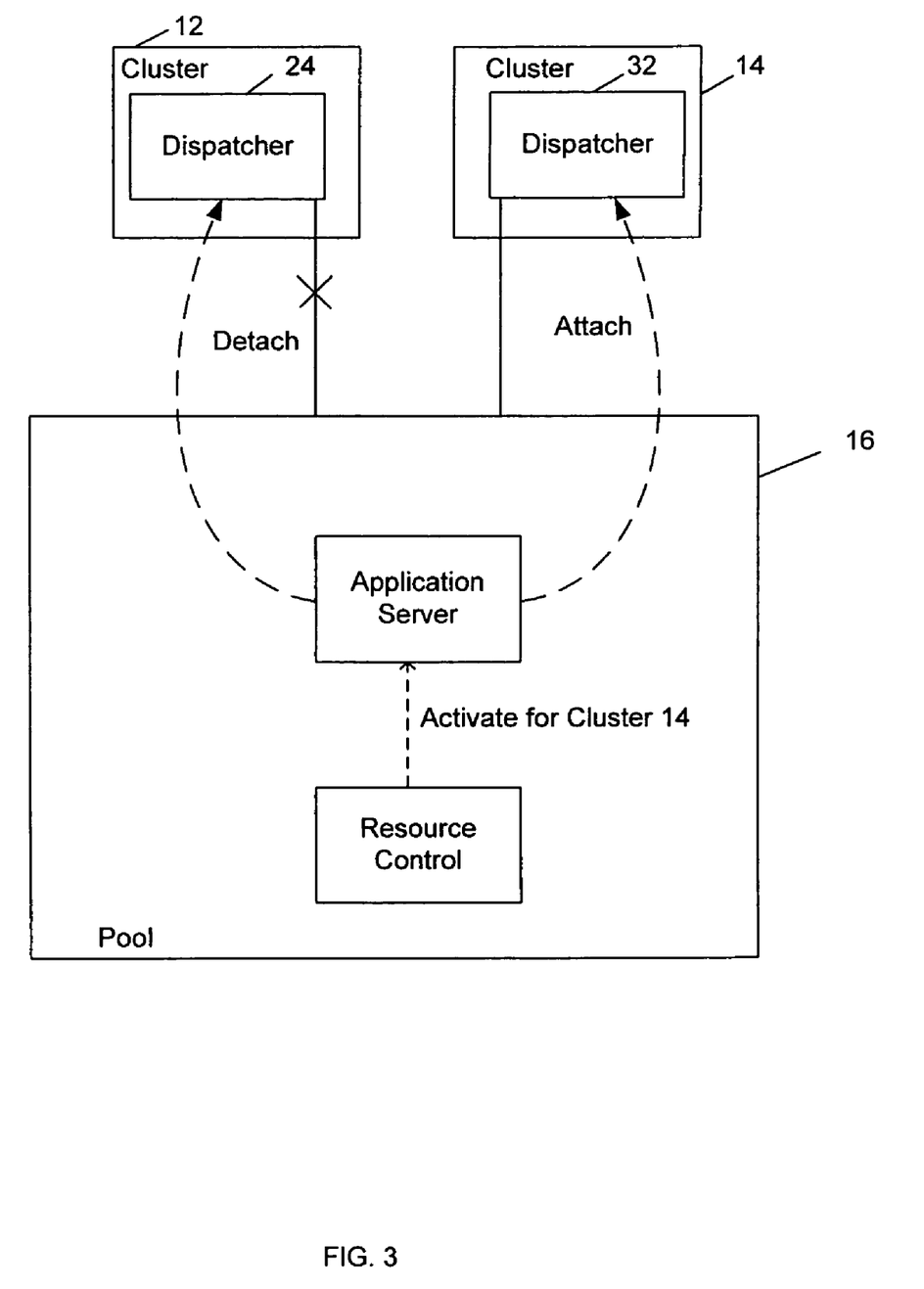
FIG. 3 is a block diagram.

In another example, assignment of resources is performed by instance sharing. As shown in FIG. 3, rather than having multiple server instances that are activated/deactivated according to the load, only one server runs on each machine. Depending on the load distribution the server is switched between the dispatchers of the managed clusters.

Figure 4:
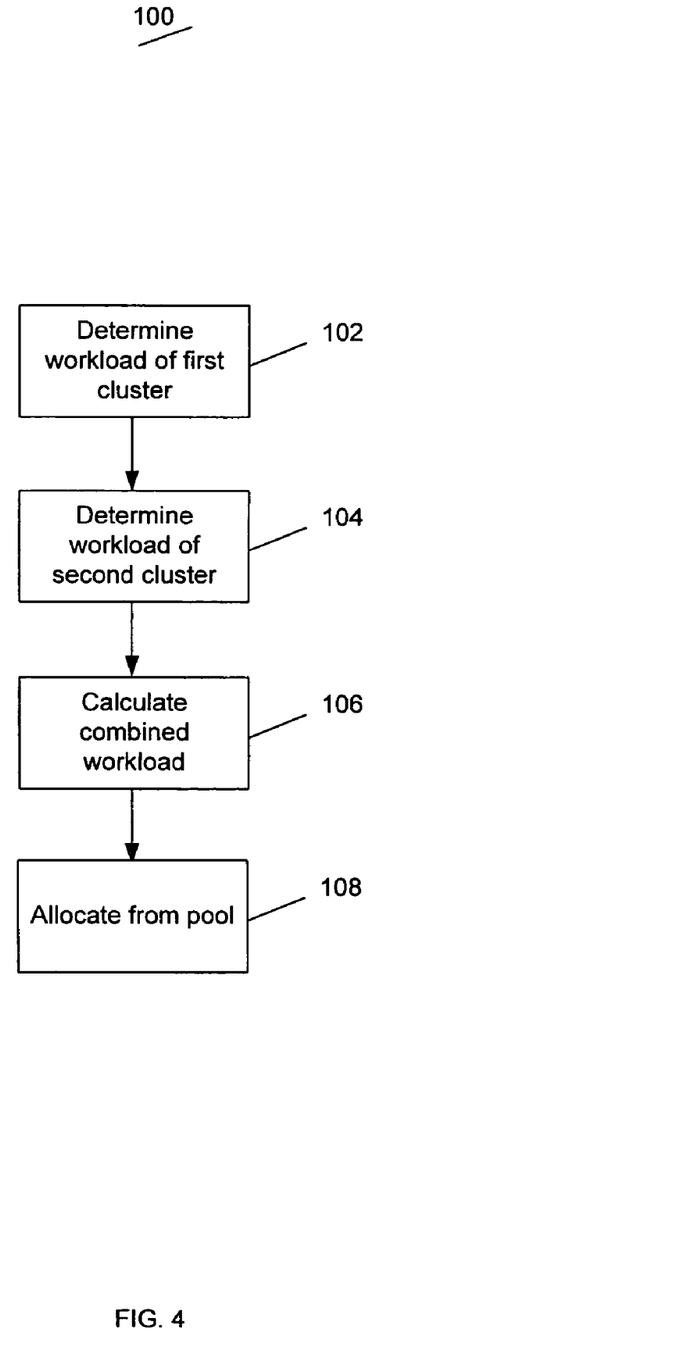

As shown in FIG. 4, a process 100 for sharing resources from a pool of servers among a first cluster of servers and a second cluster of servers includes determining (102) a current workload of the first cluster and determining (104) a current workload of the second cluster. Process 100 calculates (106) a combined workload of the first and second clusters, and allocates (108) a first number of servers from the pool to the first cluster, the first number equal to a product of a total number of servers in a pool and the first server's workload divided by the combined workload.

Allocating (108) the first number of servers can include checking a current allocation of servers to the first cluster, reassigning a number of servers from the first cluster to the second cluster if the first number of servers is less than the current allocation, and assigning a number of servers to the first cluster from the second cluster if the first number of servers is greater than the current allocation. Each server from the pool can include two server instances, one for each cluster, and wherein assigning a server to the first cluster can include activating a server application on the server for the first cluster. Reassigning a server from the first cluster can include activating a server application on the server for the first cluster. Deactivating the server application on the server can include releasing resources on the server. Deactivating the server application on the server can also include terminating a process previously spawned by the server application upon request by the first cluster.

The server can execute a server application and wherein assigning a server to the first cluster can include sending a command to the server instance to respond to requests from the first cluster. Reassigning a server from the first cluster can include sending a command to the server application to respond to requests from the second cluster.

In a particular example, determining (102) a current workload of the first cluster can include receiving a notification from a dispatcher for the first cluster. In another example, determining (102) a current workload of the first cluster can include querying a dispatcher for the first cluster.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-readable storage medium storing a computer program which, when executed by a processor, causes a computer system to perform a method for sharing resources from a pool of machines including servers among a plurality of clusters, the clusters including a first cluster and a second cluster, the method comprising:

determining a current workload of the first cluster through a first dispatcher;

determining a current workload of the second cluster through a second dispatcher;

calculating a combined workload of the first and second clusters; and allocating a first number of resources from the pool to the first cluster in accordance with $$R_{pool}(t, i) = R_{total} \frac{L(t, i)}{\sum_{k}^{n} L(t, k)},$$

wherein $R_{pool(t,i)}$ is the number of assignable resources in the pool for cluster i at time t, $R_{total}$ is the total number of resources available in the pool, $L(t,i)$ is the workload of cluster i at time t, and n is a positive integer, wherein machines from the pool include a number of server instances corresponding to the number of clusters, the server instances running processes corresponding to different clusters, wherein allocating a resource to the first cluster includes activating a server instance in the pool for the first cluster, and wherein only one server instance in a machine is active at a time.

2. The computer-readable storage medium of claim 1, wherein allocating the first number of resources comprises:

checking a current allocation of resources to the first cluster;

reassigning a number of resources from the first cluster to the second cluster if the first number of resources is less than the current allocation; and assigning a number of resources to the first cluster from the second cluster if the first number of resources is greater than the current allocation.

3. The computer-readable storage medium of claim 2, wherein the server executes a server application and wherein assigning a resource to the first cluster comprises sending a command to the server instance to respond to requests from the first cluster.

4. The computer-readable storage medium of claim 3, wherein reassigning a server from the first cluster comprises sending a command to the server application to respond to requests from the second cluster.

5. The computer-readable storage medium of claim 2, wherein reassigning a resource from the first cluster comprises deactivating a server application on the server for the first cluster while passivating the server.

6. The computer-readable storage medium of claim 5, wherein deactivating the server application on the server comprises releasing resources on the server.

7. The computer-readable storage medium of claim 6, wherein deactivating the server application on the server further comprises terminating a process previously spawned by the application upon request by the first cluster.

8. The computer-readable storage medium of claim 1, wherein determining a current workload of the first cluster comprises receiving a notification from a dispatcher for the first cluster.

9. The computer-readable storage medium of claim 1, wherein determining a current workload of the first cluster comprises querying a dispatcher for the first cluster.

10. A system of servers having shared resources, the system comprising:
 a first and a second cluster;
 a pool of machines including servers; and
 a management system for the pool;
 wherein the management system is configured to:
 dynamically assign servers from the pool to each cluster based on the cluster's current relative portion of a total workload for the clusters and in accordance with $$R_{pool}(t, i) = R_{total} \frac{L(t, i)}{\sum_{k}^{n} L(t, k)},$$

wherein $R_{pool(t,i)}$ is the number of assignable resources in the pool for cluster i at time t, $R_{total}$ is the total number of resources available in the pool, L(t,i) is the workload of cluster i at time t, and n is a positive integer;
 maintain a table comprising, for each cluster, a current workload of servers in the cluster and currently allocated servers from the pool; and
 update the table by periodically requesting a current workload from each server in the cluster to calculate an overall workload;
 wherein servers from the pool include a number of server instances corresponding to the number of clusters, the server instances running processes corresponding to different clusters,
 wherein assigning a server to a cluster includes activating a server instance on the server for the cluster, and
 wherein only one server instance in a machine is active at a time.

11. The system of claim 10, wherein each server in the pool executes one server application to handle requests for services by the clusters.

12. The system of claim 10, wherein each server in the pool executes a server application for each cluster to handle requests for services by the cluster.

13. The system of claim 10, wherein the management system is further configured to do at least the following:
 determine a current workload of the first cluster;
 determine a current workload of the second cluster
 calculate a combined workload of the first and second clusters; and
 allocate a first number of servers from the pool to the first cluster, the first number equal to a product of a total number of servers in the pool and the first server's workload divided by the combined workload.

14. The system of claim 13, wherein to allocate the first number of servers comprises:
 checking a current allocation of servers to the first cluster;
 reassigning one or more servers from the first cluster to the second cluster if the first number of servers is less than the current allocation; and
 assigning one or more servers to the first cluster from the second cluster if the first number of servers is greater than the current allocation.

15. The system of claim 14, wherein reassigning a server from the first cluster comprises deactivating a server application for the first cluster while passivating the server.

16. The system of claim 15, wherein deactivating the server application comprises releasing resources on the server.

17. The system of claim 16, wherein deactivating the server application comprises terminating a process spawned by the server application upon request by the first cluster.

18. The system of claim 15, wherein the server maintains a server application and wherein assigning a server to the first cluster comprises sending a request to the server application to respond to requests from the first cluster.

19. The system of claim 18, wherein reassigning a server from the first cluster comprises sending a request to the server application to respond to requests from the second cluster.

20. The system of claim 13, wherein determining a current workload of the first cluster comprises receiving a notification from a dispatcher for the first cluster.

21. The system of claim 13, wherein determining a current workload of the first cluster comprises querying a dispatcher for the first cluster.

22. A computer-readable storage medium storing a computer program which, which executed by a processor, causes a computer system to perform a method for sharing resources from a pool of servers among a plurality of clusters each including a dispatcher, the plurality of clusters including a first cluster with a first dispatcher, the method comprising:
 determining a current workload of the first cluster through the first dispatcher;
 calculating a combined workload of the clusters; and
 allocating a first number of servers from the pool to the first cluster in accordance with $$R_{pool}(t, i) = R_{total} \frac{L(t, i)}{\sum_{k}^{n} L(t, k)},$$

wherein $R_{pool(t,i)}$ is the number of assignable resources in the pool for cluster i at time t, $R_{total}$ is the total number of resources available in the pool, L(t,i) is the workload of cluster i at time t, and n is a positive integer, wherein the servers from the pool include only one server instance, the server instance being shared between the clusters, and wherein the server instance is switched between the respective dispatchers of the clusters depending on the allocation of servers from the pool to the clusters.

* * * * *

UNITED STATES PATENT AND TRADEMARK OFFICE
CERTIFICATE OF CORRECTION

PATENT NO. : 7,644,137 B2  Page 1 of 1
APPLICATION NO. : 11/011713
DATED : January 5, 2010
INVENTOR(S) : Bozak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Sixteenth Day of November, 2010

David J. Kappos
*Director of the United States Patent and Trademark Office*